Oct. 13, 1925.

J. GRIMM

NUT LOCK

Filed July 23, 1925

1,557,361

INVENTOR.
Jesse Grimm,
BY
Geo. P. Kimmel ATTORNEY.

Patented Oct. 13, 1925.

1,557,361

UNITED STATES PATENT OFFICE.

JESSE GRIMM, OF NEW PHILADELPHIA, OHIO.

NUT LOCK.

Application filed July 23, 1925. Serial No. 45,550.

*To all whom it may concern:*

Be it known that I, JESSE GRIMM, a citizen of the United States, residing at New Philadelphia, in the county of Tuscarawas and State of Ohio, have invented certain new and useful Improvements in Nut Locks, of which the following is a specification.

This invention relates to nut locks and has for its primary object the provision, in a manner as hereinafter set forth, of an improved type of nut lock in which a positive and sure locking action can be obtained to prevent the displacement of a nut carried upon a bolt.

The invention contemplates the provision of a bolt having its shank threaded throughout approximately one-half its length, the said threaded portion being provided through approximately one-half of the length thereof with both right and left hand threads. A right hand nut is provided having the outer face thereof formed to set up a series of bevelled lugs formed in spaced relation upon the nut. Over this there is threaded a left hand threaded nut, the inner portion of which is transversely slotted to set up a spring tongue and this spring tongue has upon the under face thereof a centrally positioned lug which is adapted to engage between two of the lugs upon the nut. The threaded bore of the lock nut extends only as far as the transverse slot formed therein, the bore from the slot to the undersurface of the lock nut being of increased diameter and threadless. The spring tongue thus formed is not hindered in its action when it is distorted by pressing against the under nut.

A final object of this invention is the provision, in a manner as hereinafter set forth, of a nut lock of improved but simple design, strong, durable and positive in action.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1:
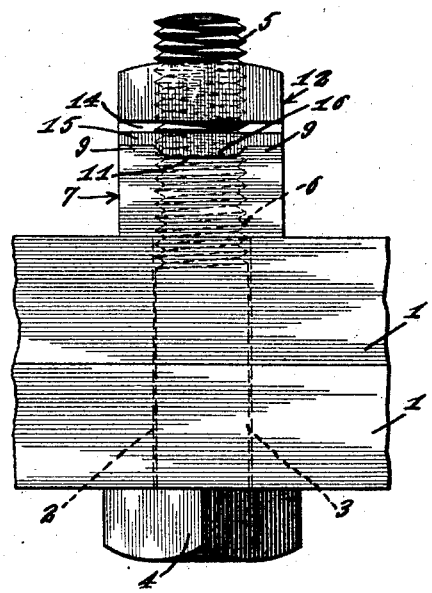
Figure 1 is a side elevation of the nut lock embodying this invention, shown as applied to a bolt and securing two bodies together.

Referring now to the drawing in detail wherein like numerals of reference indicate corresponding parts throughout the several views, there is indicated by the numeral 1 a pair of bodies having passed through apertures 2 therein the shank of a bolt 3. This bolt is provided with the usual head 4 and a portion of the outer end of the bolt shank is provided with crossed right and left hand threads 5 and from the inner end of this section having the crossed right and left hand threads there extends a portion having right hand threads only as indicated at 6. This portion extends inwardly to about the central portion of the shank 3.

Adapted to be screwed upon the portion having the right hand threads 6, over the cross threads 5, is a nut 7 having the usual threaded bore 8 therethrough and this nut is provided upon its outer face with the upstanding flat topped lugs 9, the opposed faces of which lugs are bevelled as indicated at 10. There is shown in the drawing a square nut and one lug 9 for each side of the nut, each lug being at the corner of the nut and setting up between the bevelled faces 10 of the lugs the depressed or recessed portion 11. In the event that hexagonal or octagonal nuts are used there would be also used a number of lugs corresponding to the number of sides to the nuts, six lugs being used upon the face of the hexagonal nut, one at each corner and eight lugs upon the octagonal nut and at each corner thereof as in the case of the other two.

When the nut 7 is positioned about the shank 3 and bearing against the work 1, there is superposed thereon a locking nut 12 having a bore 13 therethrough and provided with left hand threads. This locking nut is threaded upon the portion 5 of the shank as shown.

Figure 2:
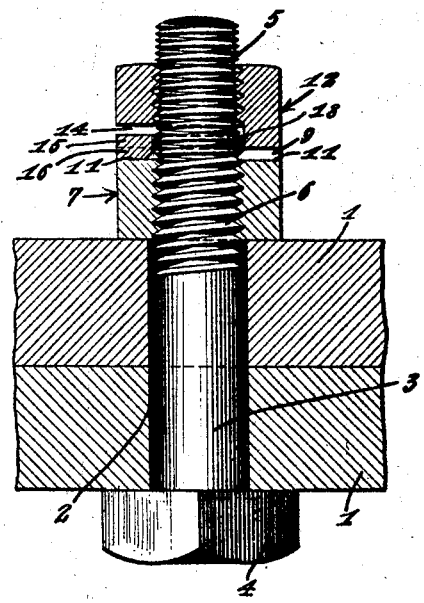
Figure 2 is a vertical section through the structure shown in Figure 1.
Figure 3:
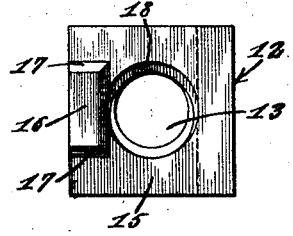
Figure 3 is a bottom plan view of the nut lock.
Figure 5:
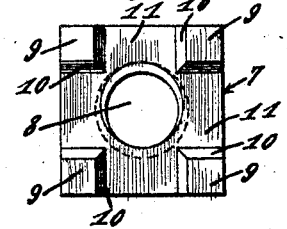
Figure 5 is a top plan view of the nut in conjunction with which the locking nut is used and, Figure 6 is a view in side elevation of the nut shown in Figure 5.
Figure 4:
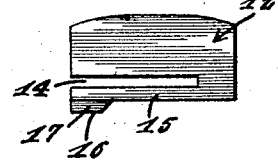
Figure 4 is a side elevation of the same.
Figure 6:

The locking nut 12 is cut transversely for a distance of approximately two-thirds through and adjacent the lower face thereof forming the slot 14 which as shown in Figure 2 extends to the opposite side of the bore 13, to set up the resilient tongue portion 15. This tongue 15 has formed upon the under face at the free outer edge thereof the lug 16, which lug is of sufficient length to snugly fit the recess 11 of the nut 7 between the lugs 9, and the inner edges of this lug are bevelled as at 17 to correspond to the bevelled surfaces 10 of the lugs 9. The bore 13 has the screw threads therein terminating at the upper portion of the slot 14, and thereafter the bore is of increased diameter as indicated at 18 and is unthreaded.

It will be seen that upon threading the lock nut 12 down upon the threaded portion 5 of the shank 3 until the lug 16 upon the lower face of the tongue 15 bears sufficiently tightly upon the top of the nut 7 to cause the lug 16 to be forced by spring action between the lugs 9, that a resilient action of the tongue will hold the lug 16 between the lugs 9 and will thus prevent the nut 7 from being turned for unscrewing. A positive and safe locking action is thus set up between the lock nut 12 and the nut 7.

Having thus described my invention what I claim is:—

1. In a nut and bolt lock the combination with a bolt having right and left hand threads, of a pair of superposed nuts one having right hand and the other left hand threaded bores, one of said nuts having a slot cut transversely thereof through approximately two-thirds of its width to set up a spring tongue, the bore through said tongue portion being of increased diameter and unthreaded, and means formed upon the abutting surfaces of the lower nut and the tongue of said upper nut to set up a locking engagement therebetween.

2. In a nut and bolt lock of the character set forth, the combination with a bolt having right and left hand threads, of a pair of superposed nuts one having right hand and the other left hand threaded bores, one of said nuts having a slot cut transversely thereof through approximately two-thirds of its width to set up a spring tongue, the bore through said tongue portion being of increased diameter and unthreaded, a lug formed upon the undersurface of said tongue, and a series of spaced lugs formed upon the top of said lower nut between which the lug of said tongue is adapted to engage through the spring action of said tongue.

3. In a nut and bolt lock of the character set forth, the combination with a bolt having right and left hand threads, of a pair of superposed nuts one having right hand and the other left hand threaded bores, one of said nuts having a slot cut transversely thereof through approximately two-thirds of its width to set up a spring tongue, the bore through said tongue portion being of increased diameter and unthreaded, a lug formed upon the undersurface of said tongue, and a series of spaced lugs formed upon the top of said lower nut between which the lug of said tongue is adapted to engage through the spring action of said tongue, said lug upon the tongue and the lugs upon said lower nut being flat and having their inner edges bevelled to cause easy engagement therebetween.

In testimony whereof, I affix my signature hereto.

JESSE GRIMM.